May 5, 1953      R. G. LE TOURNEAU      2,637,124
REAR ENDGATE ACTUATING MECHANISM FOR CARRY-TYPE SCRAPERS
Filed Aug. 19, 1947      2 SHEETS—SHEET 1

INVENTOR
R. G. LeTourneau
BY
ATTORNEYS

May 5, 1953  R. G. LE TOURNEAU  2,637,124
REAR ENDGATE ACTUATING MECHANISM FOR CARRY-TYPE SCRAPERS
Filed Aug. 19, 1947  2 SHEETS—SHEET 2
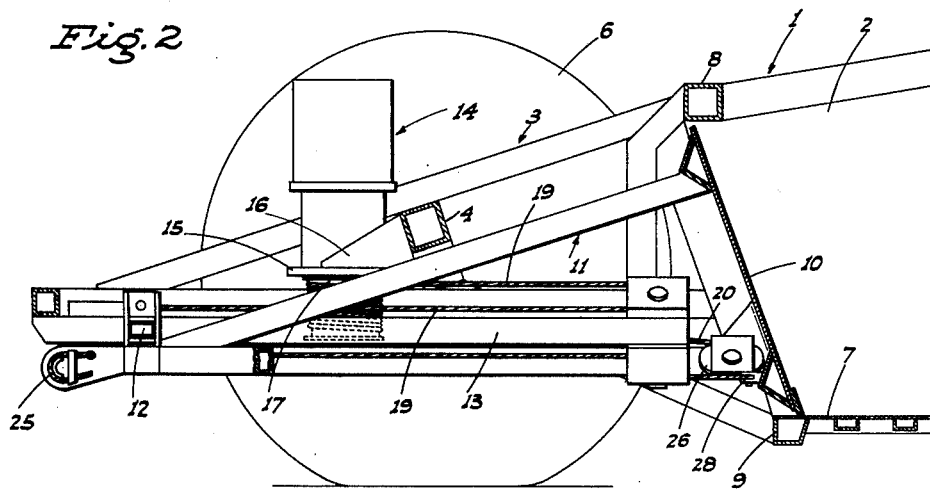
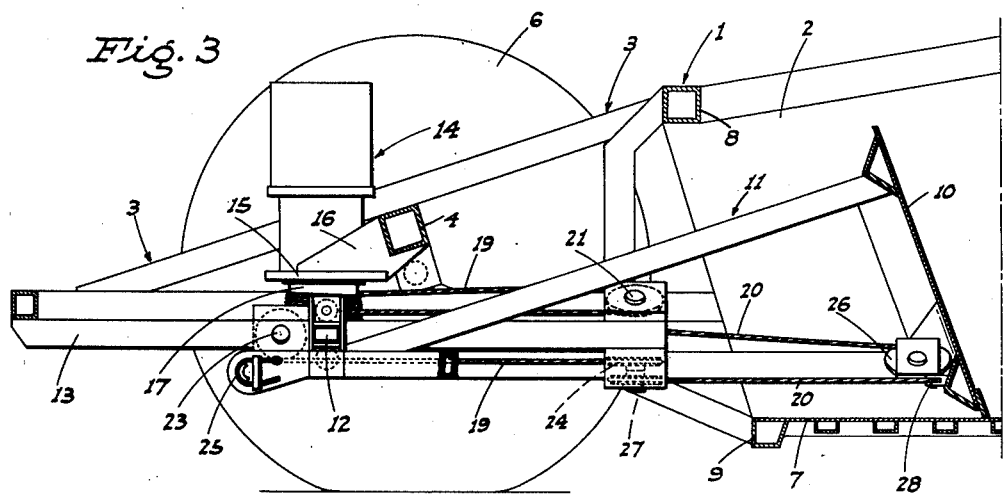
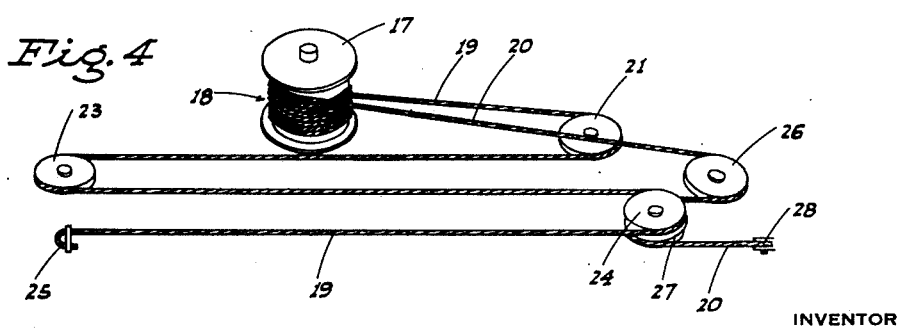
INVENTOR
R. G. LeTourneau
BY
ATTORNEYS Patented May 5, 1953

2,637,124

UNITED STATES PATENT OFFICE 2,637,124

REAR ENDGATE ACTUATING MECHANISM FOR CARRY-TYPE SCRAPERS

Robert G. Le Tourneau, Longview, Tex., assignor to R. G. Le Tourneau, Inc., Stockton, Calif., a corporation Application August 19, 1947, Serial No. 769,335

2 Claims. (Cl. 37—126)

This invention relates to improvements in carry-type earth scrapers which include a bowl, and a rear endgate movable through the bowl, from a normally retracted position, to eject the load.

The present invention provides a novel actuating mechanism for the rear endgate operative to positively advance and retract said endgate.

The invention further provides an actuating mechanism, as in the preceding paragraph, which includes, in novel assembly, a reversible, electric motor driven, power unit mounted on the scraper frame to the rear of the endgate, and a double acting cable system connected between said power unit and the rear endgate in reciprocating relation to the latter.

The invention additionally provides a rear endgate actuating mechanism which is simple and practical yet provides a rugged substantially foolproof structure which is effective for the purpose for which it is designed.

These objects are accomplished by means of such structure and relative arrangement of parts as will fully appear by a perusal of the following specification and claims.

In the drawings:

Figure 2 is a longitudinal sectional elevation on line 2—2 of Fig. 1.

Figure 3 is a similar view but shows the actuating mechanism and the endgate in partially advanced position.

Figure 4 is a diagrammatic illustration of the double acting cable system which the invention incorporates.

Figure 1:
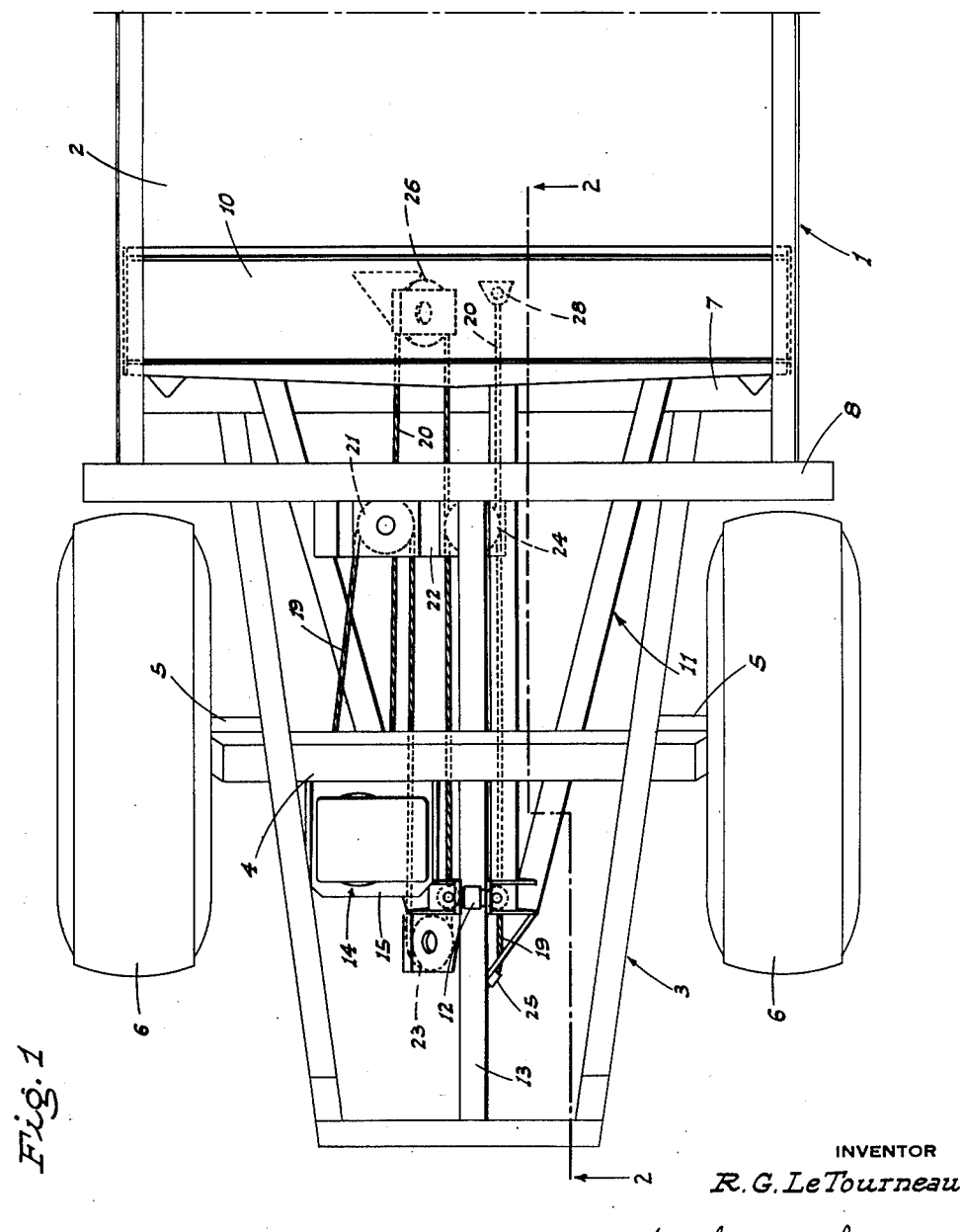
Figure 1 is a plan view showing the rear endgate actuating mechanism as embodied in a carry-type scraper; the endgate being shown in its normal retracted position.

Referring now more particularly to the characters of reference on the drawings, the rear endgate actuating mechanism is here shown embodied in a carry-type earth working scraper which includes a frame, indicated generally at 1, supporting a bowl 2 initially open at its rear end.

The main frame 1 includes, rearwardly of the bowl 2, a rearwardly projecting, rigid skeleton frame 3 having a cross beam 4 therein which is fitted at opposite ends with stub axles 5 on which pneumatic tired wheels 6 are mounted.

The bowl includes a bottom 7, and the initially open rear end of said bowl is defined at its upper edge by a top cross beam 8, and at its lower edge by a bottom cross beam 9.

A rear endgate 10 is disposed in the bowl 2 in a normally retracted position, as in Figs. 1 and 2; such rear endgate 10 riding the bottom 7 of the bowl, whereby to effectively scour the bowl bottom as the rear endgate advances. Such scouring action is enhanced by reason of the entire weight of the rear endgate resting on the bowl bottom, and additional downward pressure is attained—when said endgate advances against a load—by reason of the upward and rearward inclination of the endgate and by pushing the same from above its lower edge.

The rear endgate 10 includes a rigid rearwardly tapering push and guide frame indicated generally at 11, and at its rear end said push frame is fitted with a carriage 12 which is roller mounted on a horizontal longitudinally extending rail beam 13 fixed substantially centrally in the skeleton frame 3.

With the above arrangement, movement of the carriage 12 along the rail beam 13 forwardly or rearwardly advances or retracts, respectively, the rear endgate 10.

Such advancing or retracting motion is accomplished through the medium of the following acutating mechanism:

A reversible electric motor driven power unit, indicated at 14, is mounted with its axis vertical on a horizontal platform 15 carried by brackets 16 affixed to the cross beam 4 laterally offset from the rail beam 13. The power unit 14 includes, at its lower end and below the platform 15, a vertical axis cable drum 17; there being a single length of cable 18 wound about said drum with a number of turns intermediate the ends of said cable. There are thus two runs of the cable which lead oppositely from the drum; one run being indicated at 19 and the other run being indicated at 20.

The cable run 19 is the endgate advancing run of the cable and said run leads forwardly from the drum 17 about a direction changing sheave 21 carried on a mounting plate 22 in the skeleton frame 3 ahead of the power unit 14. From the fixed direction changing sheave 21 the cable run 19 extends rearwardly and turns about a direction changing sheave 23 fixed on the carriage 12 for movement therewith. After passing about the direction changing sheave 23 the cable run 19 goes forward and turns about a direction changing sheave 24 on the mounting plate 22, and thence said cable run passes rearwardly to a dead end 25 on the push frame 11.

The other cable run 20, which is the endgate retracting run, extends forwardly from the cable drum 17 and turns about a direction changing sheave 26 secured to the back of the rear endgate 10, and thence extends rearwardly about another direction changing sheave 27 on the mounting plate 22. After passing about the direction changing sleeve 27 the endgate retracting run 20 of the cable passes forwardly and dead ends, as at 28, on the back of said rear endgate 10.

With the above cable system, which is double acting, rotation of the cable drum 17 by the power unit 14 in one direction causes the cable run 19 to wind onto the drum shortening the effective length of said run and advancing the carriage 12 on the rail beam 13. This thrusts the rear endgate 10 forwardly advancing it in the bowl 2 to eject the load from the latter. When this occurs the effective length of the other cable run 20 is increased.

Upon reverse of the power unit 14, and turning of the cable drum 17 in the opposite direction, the cable run 19 is increased in its effective length whereas the cable run 20 is shortened causing retraction of the carriage 12 with the connected rear endgate 10, returning the latter to its normal retracted or starting position.

As the power unit 14 and the double acting cable system are mounted in their entirety in the skeleton frame 3 at the rear of the scraper, the structure is quite compact and permits of the elimination of numerous working parts otherwise necessary. The mechanism is practical, rugged and smooth operating; providing positive advancing and retracting motion of the rear endgate at the selection of the tractor operator. The reversible, electric motor driven, power unit 14 is controlled and energized through the medium of a control circuit (not shown) which leads forwardly to the tractor and there includes a reversing switch accessible to the tractor operator.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful and upon which Letters Patent is desired:

1. A rear endgate actuating mechanism for a carry-type scraper which includes a bowl having the endgate supported therein for reciprocation from a normally retracted position, and a rigid frame projecting rearwardly from the bowl; said mechanism comprising a push frame projecting rearwardly from the endgate, a longitudinal rail beam in the rigid frame, a carriage on the push frame riding the rail beam, a reversible power unit mounted on the rigid frame, the power unit including a cable drum, a cable wound intermediate its ends about the drum to form a pair of opposed runs leading from the drum in a forward direction, a pair of direction changing sheaves on the rigid frame ahead of the carriage, a direction changing sheave on the carriage, one run of the cable extending between said pair of sheaves with a loop running rearward over the sheave on the carriage, means dead ending said one run on the push frame, another pair of direction changing sheaves mounted one on the rigid frame and one on the endgate, said other run passing about the sheave on the endgate, thence extending rearward to and about the one of the sheaves of said other pair, on the rigid frame, and then passing forward, and means dead ending said other run on the endgate.

2. A rear endgate actuating mechanism for a carrying scraper which includes a bowl in which the endgate is supported for longitudinal reciprocation from a normally retracted position, and a pair of separate rearwardly projecting frames rigid with the bowl and endgate respectively, a longitudinal rail on one frame and a carriage on the other frame riding the rail; the actuating mechanism comprising a reversible power unit mounted on said one frame and including a cable drum, a cable wound intermediate its ends about the drum to form a pair of opposed runs leading forwardly from the drum, a pair of direction-changing sheaves on said one frame ahead of the drum, a third direction-changing sheave mounted with said other frame rearwardly of the first named sheaves, one run of the cable extending between said pair of sheaves with a loop running rearward over said third sheave, means dead-ending said one run on the other frame, a fourth direction-changing sheave on said one frame and a fifth direction-changing sheave mounted in connection with the other frame ahead of said pair of sheaves, said other run of the cable passing about said fifth sheave, thence extending rearward to and about said fourth sheave forwardly, and means dead-ending said other run in connection with said other frame.

ROBERT G. LE TOURNEAU.

References Cited in the file of this patent

UNITED STATES PATENTS

| Number | Name | Date |
|---|---|---|
| 855,336 | Randall et al. | May 28, 1907 |
| 2,246,083 | Weber | June 17, 1941 |
| 2,298,982 | Smith | Oct. 13, 1942 |
| 2,345,313 | Armington et al. | Mar. 28, 1944 |
| 2,353,120 | Austin | July 11, 1944 |
| 2,394,483 | Rockwell | Feb. 5, 1946 |
| 2,395,244 | Austin | Feb. 19, 1946 |
| 2,406,300 | Le Tourneau | Aug. 20, 1946 |
| 2,422,813 | Walch | June 24, 1947 |
| 2,529,848 | Murray | Nov. 14, 1950 |

FOREIGN PATENTS

| Number | Country | Date |
|---|---|---|
| 536,317 | Great Britain | May 9, 1941 |